C. P. GRONBERG.
Harvester.
No. 87,770.
2 Sheets—Sheet 1.
Patented March 16, 1869.
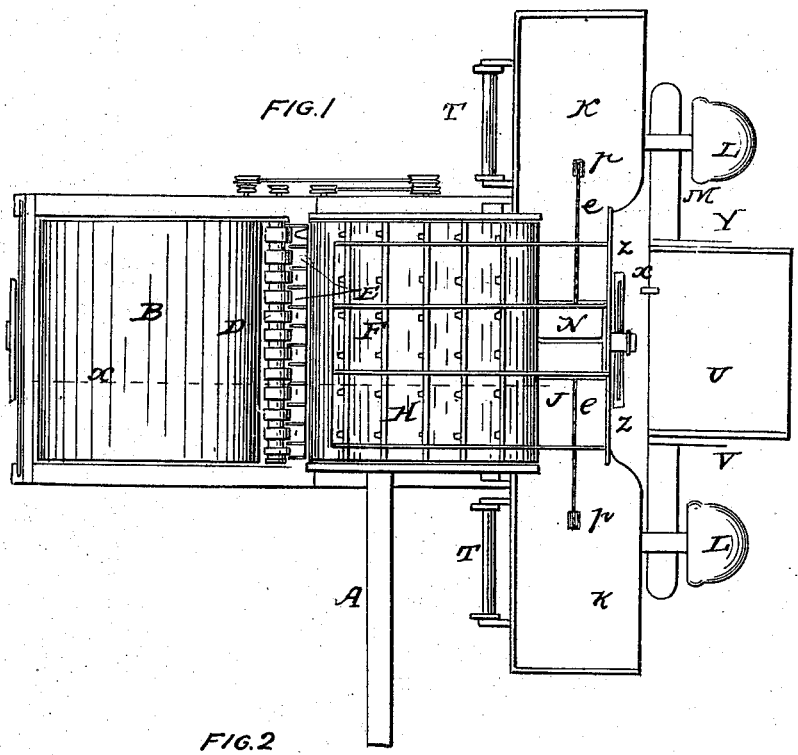
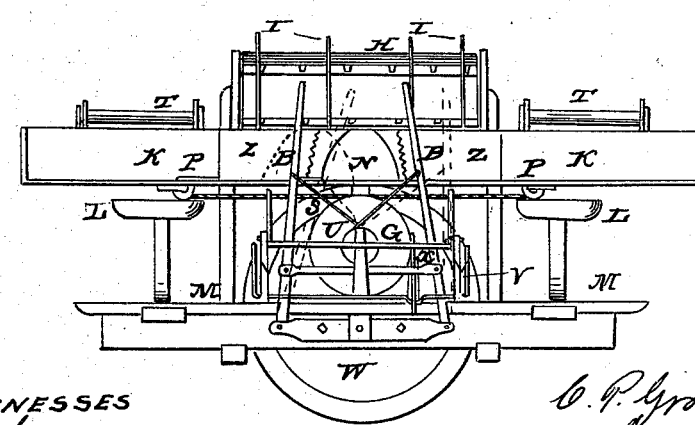
WITNESSES
INVENTOR C. P. GRONBERG.
Harvester.
No. 87,770.
2 Sheets--Sheet 2.
Patented March 16, 1869.
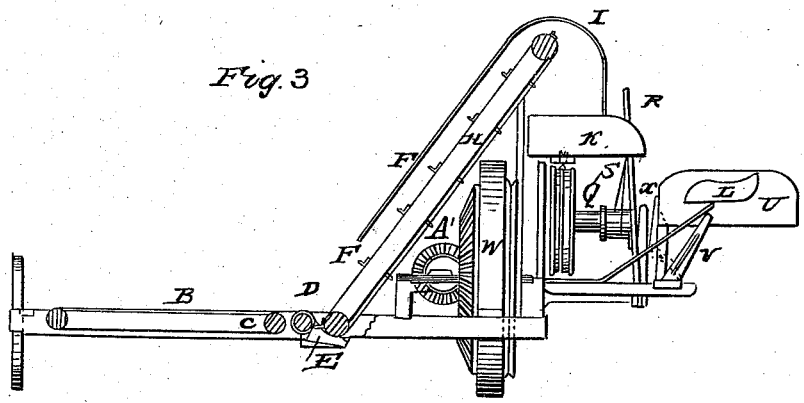
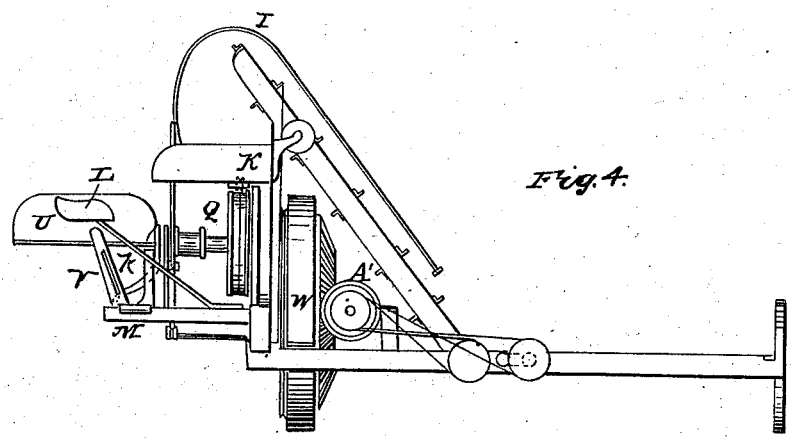

UNITED STATES PATENT OFFICE.

C. P. GRONBERG, OF AURORA, ILLINOIS.

IMPROVEMENT IN HARVESTERS.

Specification forming part of Letters Patent No. 87,770, dated March 16, 1869.

*To all whom it may concern:*

Be it known that I, C. P. GRONBERG, of Aurora, in the county of Kane and State of Illinois, have invented a new and useful Improvement in Harvesters; and I do hereby declare the following to be a full, clear, and exact description of the same, reference being had to the accompanying drawings, and the letters and figures marked thereon, which form a part of this specification, and in which—

Figure 1 represents a top or plan view of that part of the harvester which embraces my improvement; Fig. 2, a rear elevation of the same; Fig. 3, a side elevation, with the parts carrying the endless aprons in section at the line $x$ in Fig. 1; and Fig. 4, a side view of the opposite side of the machine.

My invention relates to that class of harvesters which elevates the grain into a box or hopper from which the binders, riding on the machine, take the grain and bind it; and it consists in a sliding device, which can be operated by the binder to carry the grain for each bundle upon the binder's table; also, in the special device, hereafter described, for operating said sliding device; and it also consists in the device, herein shown and described, for conveying the grain from the horizontal endless apron to the inclined or elevating endless apron; and also in the special arrangement of the guides for guiding the grain to the grain-receptacle.

To enable those skilled in the art to understand how to manufacture and use my improved machine, I will proceed to describe the same with particularity.

The same letters of reference refer to the corresponding parts in the different figures.

In the annexed drawings, A represents the tongue of the harvester, and B an endless apron, which is carried on the rollers C. As the grain is cut it falls upon the endless apron B, and is carried over the grooved roller D onto the ledges or ribs E. These ledges are arranged so that one edge thereof lies in the grooves on the roller, so that no grain can pass down behind them, and they are so arranged that the fingers F in the endless apron H, as they revolve around, come between them beneath the grain, thereby lifting it and carrying it up the incline on the said endless apron or belts. As the grain is being elevated, it passes beneath the wire guides I, and is by them kept from being blown away as it is being elevated or carried over the grain receiver or hopper as it is discharged from the elevating-apron. The grain is deposited upon the grain-receiver J from the endless apron H, and at each end of said grain-receiver there is arranged a binders' table, K, back of which are the binders' seats L, and cross-beam or platform M for them to stand upon.

There is a sliding piece, N, so arranged in the hopper J that it will slide to one end of the hopper, and when sufficient grain has fallen into the hopper for a bundle, said slide can be slid across to the other end of said hopper, as hereinafter described, carrying the grain onto one of the binder's tables K, and when there has sufficient grain fallen for another bundle it can be slid across back again and carry said grain out onto the other binder's table.

By this device each binder, sitting or standing at his table K, has the grain, in quantities sufficient for a bundle, brought directly onto his table in front of him.

This sliding piece N is operated to slide the grain onto the binders' tables by cords O attached to each side of it, and passing over the pulleys P onto the spool Q, and are so arranged thereon that as one cord is wound upon the spool to slide the grain onto one of the tables the other cord unwinds. One cord may be used, one end thereof being attached to one side of the sliding piece N, and the other to the other side, the said cord passing around the spool Q, in such a way that when the spool is turned it will move the slide.

The spool is turned by means of the levers R, which are within easy reach of the binders, and can be moved by them, as indicated by the dotted lines in Fig. 2; and as they are moved they cause the spool Q to revolve through the action of the cord S, which is attached to said levers, and passes around the shaft of the spool Q. When there is sufficient grain in the hopper for a bundle, one of the binders takes hold of one of the levers R, and by moving it, slides the grain for a bundle onto his table, and by the time there has sufficient grain fallen into the hopper for another bundle the other binder is ready for a bundle to bind, and, by simply moving said levers R in the opposite direction, slides the grain upon his table ready to be bound. T T are spools for bands or twine for binding. U is a platform or receptacle for the bundles of grain, and is pivoted to the standards V, a little in front of its center, being held in a horizontal position by the catch X.

When the binders have a sufficient number of bundles upon the receptacle U for a shock of grain, the catch X is thrown back by operating a cross shaft or lever, which extends out near the binders, when the receptacle swings upon its trunnions, and dumps the said bundles in a pile upon the ground.

The hopper J has a back board, Z, to the top of which the guide-wires I are attached. Therefore the grain must necessarily fall into the hopper J, and it can be taken therefrom only at the ends of said hopper, as above described. The sliding piece N has a vertical piece extending across the hopper J, in such a manner that the ends of the straws of grain rest against it as they are being moved to the binder's table; but I consider the form of said sliding piece immaterial if it be so constructed as to carry the grain to the binders' tables, substantially as above described.

W is the drive-wheel, and drives the shaft A' by the bevel-gearing. (Clearly shown in Figs. 3 and 4.) Upon the shaft A' are pulleys carrying bands, which drive the shafts which carry the endless aprons, and also the creased shaft D; or said shafts may be driven in any other well-known way.

Heretofore there has been much difficulty experienced in transferring the grain from the horizontal apron to the elevating-apron on account of its clogging between them. This difficulty I overcome by means of the creased roller D, which, by revolving, carries the grain over upon the ribs E, where it is held in a position for the elevating-fingers F to pass beneath it and elevate it by the ribs E extending into the creases in the roller D. There is no possible chance for the grain to pass around with the said roller.

Having thus fully described the construction and operation of my harvester improvements, what I claim, and desire to secure by Letters Patent, is—

1. The sliding device N, when arranged in a harvester so as to carry the grain for each bundle to the binders' tables.

2. The combination of the sliding device with the cords O and spool Q, when arranged and operating substantially as and for the purposes specified.

3. The combination of the creased roller D, ribs E, and endless aprons B and H, when constructed and operating substantially as and for the purposes specified.

4. The wire guides I, attached to the grain-receiver or hopper, and arranged substantially as described.

C. P. GRONBERG.

Witnesses:
H. F. VAN NORTWICK,
JOHN F. RANG.